(12) United States Patent
Gutierrez Castrejon et al.

(10) Patent No.: US 12,047,208 B2
(45) Date of Patent: Jul. 23, 2024

(54) CHROMATIC DISPERSION TOLERANT PAM-M TRANSCEIVER FOR OPTICAL ROUTING TO EXTENDED PATHS

(71) Applicant: Telefonaktiebolaget LM Ericsson (publ), Stockholm (SE)

(72) Inventors: Ramon Gutierrez Castrejon, Montreal (CA); Saber Md Ghulam, Ottawa (CA); David V. Plant, Montreal (CA); Robert Brunner, Montreal (CA); Luca Giorgi, Ponsacco (IT); Tommaso Catuogno, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/923,981

(22) PCT Filed: May 12, 2020

(86) PCT No.: PCT/IB2020/054494
§ 371 (c)(1),
(2) Date: Nov. 8, 2022

(87) PCT Pub. No.: WO2021/229265
PCT Pub. Date: Nov. 18, 2021

(65) Prior Publication Data
US 2023/0171135 A1 Jun. 1, 2023

(51) Int. Cl.
*H04L 25/49* (2006.01)
*H04B 10/54* (2013.01)
*H04B 10/2513* (2013.01)
(52) U.S. Cl.
CPC ....... *H04L 25/4917* (2013.01); *H04B 10/541* (2013.01); *H04B 10/2513* (2013.01)

(58) Field of Classification Search
CPC ........ H03K 7/02; H03K 9/02; H04B 10/2513; H04B 10/5167; H04B 10/541;
(Continued)

(56) References Cited

U.S. PATENT DOCUMENTS 9,699,009 B1 * 7/2017 Ainspan .................. H04L 25/49
2014/0140389 A1 * 5/2014 Chen .................. H04L 25/03146
375/233

(Continued)

FOREIGN PATENT DOCUMENTS

WO 2018162743 A1 9/2018
WO 2019034919 A1 2/2019

*Primary Examiner* — Young T. Tse
(74) *Attorney, Agent, or Firm* — Murphy, Bilak & Homiller, PLLC

(57) ABSTRACT

Methods in an optical receiver, for decoding a received M-level pulse-amplitude-modulated, PAM-M, optical signal. An example method comprises, for a first interval, decoding (510) the received PAM-M optical signal using a standard PAM-M decoder with M-1 thresholds, using first sampling times, to obtain a first set of decoded bits, and decoding (520) the received PAM-M optical signal using a duobinary decoder with 2M-2 thresholds, at second sampling times offset from the first sampling times, to obtain second set of decoded bits. The method further comprises calculating (530) first and second error metrics corresponding to the first and second sets of decoded bits, respectively, and selecting (540) the standard PAM-M decoder or the duobinary decoder for subsequent decoding of the received PAM-M optical signal, based on the first and second error metrics.

17 Claims, 4 Drawing Sheets

(58) Field of Classification Search
CPC .. H04B 10/616; H04B 10/6161; H04B 10/67; H04B 14/023; H04L 25/4917
USPC ............ 375/286, 287, 291, 293, 320, 353
See application file for complete search history.

(56) References Cited

U.S. PATENT DOCUMENTS

2016/0241274 A1* 8/2016 Chan ................ H03M 13/6508
2019/0280775 A1* 9/2019 Gao ................... H04B 10/5167

* cited by examiner

CHROMATIC DISPERSION TOLERANT PAM-M TRANSCEIVER FOR OPTICAL ROUTING TO EXTENDED PATHS

TECHNICAL FIELD

The present disclosure is generally related to optical communication systems and is more particularly related to decoding PAM-M optical signals in an optical receiver.

BACKGROUND

Dramatic growth in the bandwidths required for optical communication systems has increased the motivation to encode digital information in multilevel optical signals. For a particular desired data rate, multilevel modulation introduces a lower symbol rate and narrower spectra, which relax the bandwidth requirements of the optoelectronic components. On the other hand, for a given optical signal power, multilevel signaling reduces the distance between the levels, resulting in a lower resilience to electrical noise, optical noise, non-linear distortions, and other impairments.

As optical interconnect distances increase, different spectral components of lased light will propagate at different speeds through a medium (e.g., an optical waveguide), even when the lased light is composed of a relatively narrow spectrum, i.e., having a relatively narrow linewidth. A consequence of this is that the lased light will arrive dispersed at the remote end. This property is known as chromatic dispersion.

At very high symbol data rates (baud rates) in combination with longer optical links, chromatic dispersion will result in the temporal overlapping of successive symbols at the remote end of the optical fiber, a phenomenon known as inter-symbol interference. Dispersion within an optical fiber is expressed in ps/(nm·km) relative to a nominal center wavelength (without dispersion), making it relatively easy to calculate the symbol overlap in a system due to chromatic dispersion. If an optical pulse represents the actual transmitted symbol propagating along a waveguide of length L, the temporal spreading of the optical pulse due to the effect of chromatic dispersion is given by $\Delta t = DL\Delta\lambda$, where D is the dispersion parameter of the waveguide and $\Delta\lambda$ represents the linewidth of the lased light.

In recent years, one of the leading multilevel modulation techniques for 100 Gbits, and beyond, is 4-level pulse amplitude modulation (PAM-4). These data rates might be used for both short intra-data center optical links as well as inter-data center optical links with lengths a few tens of kilometers. Short distances relax the requirements for the signal-to-noise ratio (SNR). Consequently, modulation formats with lower noise tolerance, such as PAM-4, but that can be received using direct detection (DD) receivers, are very attractive for these applications. However, it is expected that in the future the transmission data rates in some applications, e.g., when communicating short distances within or between optically-enabled integrated circuits, will reach several Terrabits per second (Tb/s). Despite the short distances involved, the use of these very high data rates requires the use of optical waveguides and optical switches that dynamically interconnect resources that are separated by distances ranging from less than a few centimeters to tens or hundreds of meters. These links might be: on-chip, covering distances less than 5 cm; on the same blade or circuit board, covering distances up to 50 cm; within the same equipment chassis or rack, covering distances up to 1 meter or so; or between pieces of equipment within a large datacenter/central-office, separated by distances up to 1 kilometer.

At the longer of these distances, chromatic dispersion will continue to be a problem at Tb/second data rates. Therefore, there is great interest in introducing performance improvements in term of bandwidth-constrained transmission environments and higher dispersion tolerance for the multilevel modulations and DD architecture to achieve terabit transmission.

SUMMARY

Described herein are methods and apparatus for decoding modulated optical signals, where the optical receiver is able to adapt itself to different chromatic dispersion conditions. These techniques allow a single transceiver using this method to properly operate irrespective of the waveguide length.

More particularly, the techniques detailed herein involve an optical receiver switching between decoding a received optical signal using standard M-level pulse-amplitude-modulated (PAM-M) decoding or decoding the same signal using duobinary PAM-M (DB-PAM-M) decoding, depending on which will provide the best performance, given the current conditions. By doing so, the receiver may operate over a wide variety of chromatic dispersion conditions.

An example method for decoding a received M-level pulse-amplitude-modulated, PAM-M, optical signal is carried out in an optical receiver. This example method comprises, for a first interval, decoding the received PAM-M optical signal using a standard PAM-M decoder with M-1 thresholds, using first sampling times, to obtain a first set of decoded bits, and decoding the received PAM-M optical signal using a duobinary decoder with 2M-2 thresholds, at second sampling times offset from the first sampling times, to obtain a second set of decoded bits. The method further comprises calculating first and second error metrics corresponding to the first and second sets of decoded bits, respectively, and selecting the standard PAM-M decoder or the duobinary decoder for subsequent decoding of the received PAM-M optical signal, based on the first and second error metrics.

The techniques and devices described herein can be used, in various embodiments, to enable high-bandwidth communication in contexts where, for example, as described above, highly variable chromatic dispersion impairment and dynamically variable link length is expected. These techniques may also be used in reconfigurable optical networks, where, even given a constant path length, the accumulated chromatic dispersion may depend on the presence of heterogeneous devices. This is achieved in such a way that switching between formats can be achieved at practically no extra cost.

No extra elements in the transceiver are required, compared to conventional devices, thus the original footprint is maintained. Further, power consumption is kept at about the same level as the one generated by a non-switchable transceiver. The switching process can be carried out at software level, thus representing a future-proof solution that provides hardware re-utilization.

DETAILED DESCRIPTION

Figure 1:
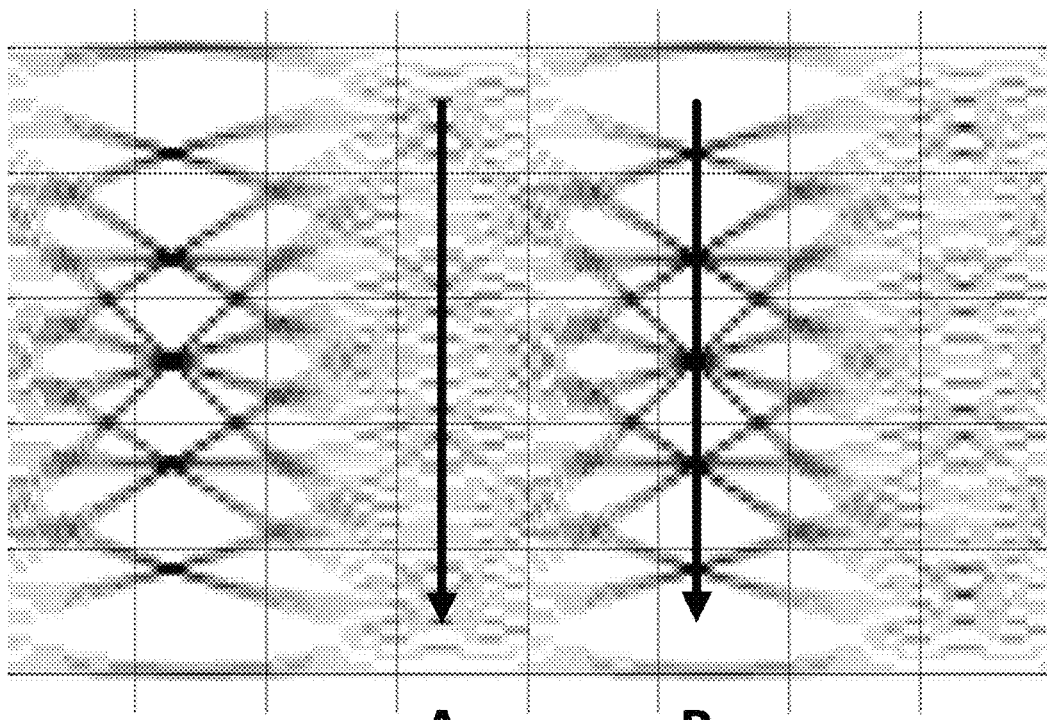
FIG. 1 is an eye diagram for an example PAM-4 signal after undergoing chromatic dispersion.

As noted above, it is expected that transmission data rates in some applications, e.g., when communicating short distances between various optically enabled components will reach several terabits per second (Tb/s). One example of such an application is the stacked three-dimensional electronic photonics integrated circuit (3D-EPIC), examples of which are described in International Patent Application PCT/IB2017/055023, filed 18 Aug. 2017, the entire contents of which are incorporated by reference. This technology will include on-chip optical routing as well as supporting the routing of optical traffic off-chip, to other nearby 3D-EPICs and/or to other devices, blades, servers, etc.

For the very short distances within an optical device, chromatic dispersion may not be problematic at these very high data rates. However, communicating at these high data rates over longer distances within a rack, between racks, or even between buildings on a multi-building campus, can still produce problems with chromatic dispersion. Further, because devices and other equipment can be interconnected with optical switches, with switching configurations that are dynamically changed, a given optical output may need to drive optical links with lengths that vary over time by several orders of magnitude, from less than a few centimeters to hundreds or thousands of meters. This means that the optical transmitters and receivers used for these links must be capable of flexibly adapting to these drastic changes in conditions, preferably without unnecessarily reducing the desired high data rates. Thus, a key challenge is the realization of solutions able to dynamically operate at different link lengths, which will produce different levels of accumulated chromatic dispersion, while maximizing supported data rates and reducing, at the same time, power consumption, footprint and cost.

Traditional dispersion compensation methods such as the use of waveguide segments exhibiting dispersion of opposite sign or fiber Bragg gratings are too bulky for the applications contemplated here. Moreover, a key drawback is their lack of adaptability. In other words, these devices must be designed on a case-by-case basis for a particular chromatic dispersion condition (or link length), preventing their use in and with optically routed EPICs, where the optical path length may vary from one moment to the next.

The techniques described herein provide a more generally applicable method for decoding modulated optical signals, where the optical receiver can adapt itself to different chromatic dispersion conditions. These techniques provide a more convenient approach since a single transceiver using this method will be able to properly operate irrespective of the waveguide length. This is particularly relevant for EPICs because in many cases the interconnection path (and consequently the path length) is a priori unknown, since there are different possible alternatives to route the signals. The interconnection path is usually dynamically allocated following an optimization criterion and switch availability.

To minimize complexity and cost, the techniques disclosed herein build on straightforward modulation formats, based on intensity modulation with direct detection, i.e., with no requirement for coherent detection techniques. In particular, the family of M-ary pulse amplitude modulation (PAM-M) formats, which are well-known and reliable, are used in the currently disclosed techniques. They exhibit extraordinary simplicity and hence ease of implementation. They have been widely accepted by industry and academia as the format of choice for the implementation of several standards, recommendations, and multi-source agreements (MSAs), such as 100 GbE and 400 GbE. The techniques described herein thus facilitate a multi-Tb/s transceiver able to extend the reach of the transmission link by simply switching a transmission modulation format to its duobinary (also known as partial response) counterpart: DB-PAM-M, with M=2, 4, 8, etc., as detailed below.

Optically connected resources try to achieve best transmission performance using a BER (Bit Error Rate) metric. The better the link performance, the less likelihood of data frame retransmissions. The use case of future 3D-EPICs already described, requires optimal signal recovery for dynamic optical link lengths.

With the aid of an oscilloscope, it can be seen that a PAM-M encoded pseudo-random bit stream after experiencing chromatic dispersion shows a closed eye-diagram. As seen in the example shown in FIG. 1, which shows a PAM-4 signal after experiencing substantial chromatic dispersion, this can result in the image being garbled to the point where the discrete PAM-M levels are indistinguishable at the sampling point that would normally be optimal for direct detection of the PAM-4 signal (see point A in FIG. 1). At the same time, however, the image in FIG. 1 shows that there is an "open eye" at a different sampling point, i.e., point B in the figure, having distinguishable discrete levels, at what might be called the symbol "transition" region between the normal sampling points. In the optical domain, this transition region is mathematically the sum of the "next" and "previous" PAM-M symbol levels (see point B in image above), where the "next" PAM-M symbol level is the targeted level following the transition region and the "previous" symbol level is the targeted level prior to the transition region.

Figure 2:
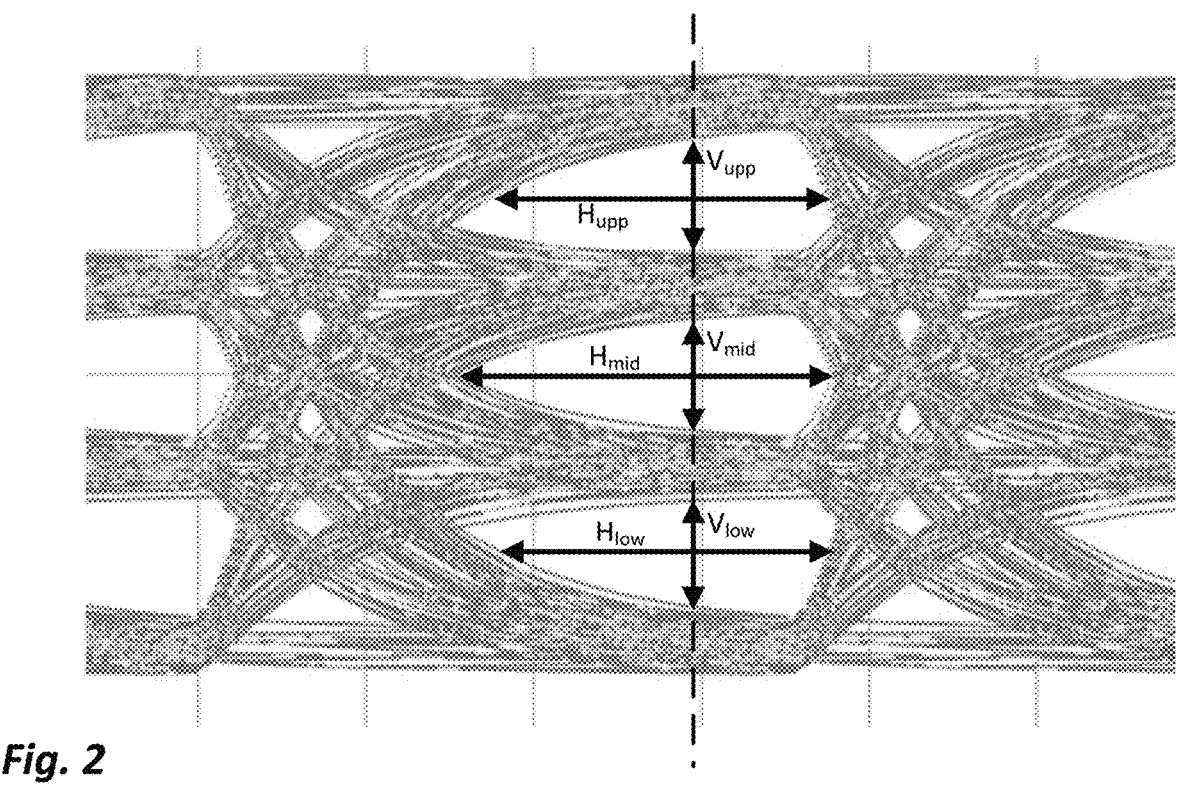
FIG. 2 is an eye diagram for an example PAM-4 signal without significant chromatic dispersion.

The PAM-4 signal shown in FIG. 1, which is highly distorted by chromatic dispersion, can be compared to the signal shown in FIG. 2, which is relatively unaffected by chromatic dispersion. Here, there is a prominent "open eye" pattern at the optimal sampling point, where there are four distinct levels that can be readily distinguished from one another. FIG. 2 illustrates various signal height and width parameters that can be measured to determine the optimal sampling time and the optimal thresholds used to detect the four possible values the PAM-4 signal can take. Note that even in the relatively undistorted signal pattern of FIG. 2, there is another open eye pattern at the transition region between one symbol and the next—these open eye patterns correspond to the similar one seen at point B in FIG. 1. Of course, the eyes at this transition region, which separate seven distinct levels, are smaller than those at the normal PAM-4 sampling time, which separate only four distinct levels in the undistorted signal shown in FIG. 2.

Because the eye pattern at this transition region remains open even when there is substantial chromatic dispersion, this transition region may be regarded as a "chromatic-dispersion-tolerant region." A strategy to recover the garbled PAM-M transmission, therefore, is to sample at the chromatic-dispersion-tolerant region. In this region there is an open-eye pattern that has 2M-1 discrete levels. The recovered/decoded symbol value can be obtained by the detected level at this point by truncating the value corresponding to the detected level, retaining only log 2(M) least-significant bits. Thus, in the PAM-4 example shown in FIG. 1, the detected levels at point B, when converted to binary values, range from 000 to 110 (i.e., 7 discrete levels, 0-6). The detected value at a given one of the sampling times aligned to the chromatic-dispersion-tolerant region can then be truncated to the two least significant bits.

This chromatic-dispersion-tolerant PAM-M decoding is equivalent to duobinary-PAM-M (DB-PAM-M) decoding. Thus, while the transmitting end of the optical link transmits a PAM-M modulated signal, an optical receiver sampling the received signal in the chromatic-dispersion-tolerant region can decode the signal as if it were DB-PAM-M encoded at its origin.

A "dynamic threshold discovery" algorithm is employed to determine the best decode mappings on a per interconnect basis, to compensate for distorted "eye" envelopes, leading to a reduction of detection errors during the transmission process. In other words, upon starting up an optical link or changing a routing path, the optical receiver can evaluate the received signal to see whether PAM-M decoding at the "normal" sampling times is superior or inferior to DB-PAM-M decoding at the chromatic-dispersion-tolerant regions. If chromatic dispersion is relatively low, e.g., when the length of the optical link is very short, the "standard" PAM-M decoding may be preferred, since the "eyes" may be larger than at the chromatic-dispersion-tolerant region. On the other hand, if the bit error rate using PAM-M decoding is too high, the receiver may determine that it would be better off performing DB-PAM-M decoding at the chromatic-dispersion-tolerant region.

A handshaking procedure may be used, in some embodiments, to set up an optical link and determine the best decoding mode and the best parameters to use in that mode. Initially, when the link is being established (e.g., by optical switching), a "training pattern" is transmitted, which permits the optically linked transceivers to lock their phase-locked loops to a symbol period. In a fixed rate PAM-M encoding scenario, the receiving end will then temporarily activate both PAM-M and DB-PAM-M decode circuitry, either simultaneously or one after another. A comparison of the bit error rate (BER) for the two decoder modes determines which decoder is best for the current link condition. At this point, the inferior one may be de-activated.

Some embodiments may allow for changes in data rate, to exploit a given optical link as fully as possible. In a multi-rate PAM-M encoding scenario, the lowest order of M=2 encoding is initially utilized on the transmitter side, while the receiver end decodes the received signal temporarily with both PAM-2 and DB-PAM-2 decoders activated. (Note that for the PAM-2 case, differential non-return-to-zero encoding is used at the transmitter end.) If the BER conditions remains satisfactory after a certain predetermined number of frames, the MAC-layer at each receiver end may issue a "speed-up" control character or frame sequence to the transmitter end, in which case both ends acknowledge with an ACK message and proceed on a "speed-up" trend, by increasing the order of the modulation scheme, e.g., from PAM-2 to PAM-4, from PAM-4 to PAM-8, etc. Should the BER decline in performance after an increase in the modulation order, the remote ends can negotiate a "speed-down" sequence followed by reciprocal ACK messages. In the event of high BER where an ACK is not received, an implicit NACK signal is assumed after a predetermined number of frames, which causes the remote ends to step back to the last functioning state. Similarly, after a certain number of frames without successful handshaking, the remote ends can simulate a break in the link, forcing a reset state that starts the procedure over.

Investigation by the present inventors has demonstrated that DB-PAM-M modulation formats perform well under severe chromatic dispersion conditions, and therefore become a natural choice to extend the reach of a system designed to support PAM-M modulation, in the event that it underperforms due to excessive accumulated chromatic dispersion. As suggested above, this may occur mainly when the waveguide length extends beyond the original tolerance, due to the dynamic allocation of the different paths available in an EPIC or due to unforeseen modifications to the subsystem architecture. Moreover, due to the narrower bandwidth exhibited by duobinary-PAM-M signals compared to PAM-M signals, for a given M and data rate value, the former modulation format performs better on bandwidth-constrained channels. This situation normally arises in Tb/s environments or when harsh bandwidth conditions are in effect; for example, those conditions produced by concatenation of opto-electronic or all-optical filters along the routing path due to the presence of an excessive number of switches/routers.

Switching between the formats as described in general terms above is relatively easy, as the processes for detecting either the PAM-M or the DB-PAM-M signal are similar, at the receiver. Practically speaking, two different sampling points and threshold count values are used for these two cases. In addition, an extra digital addition is needed at the decoding stage, for the PAM-M decoding, as will be seen in the detailed description of the algorithms provided below.

Indeed, transmission in either modulation format is carried out as follows. Let $[a_n] \in \{0,1,\ldots,M-1\}$ be a PAM-M data stream of n symbols to be transmitted, and k=1,2, 3, ..., n. Below, Case 1 corresponds to the PAM-M choice, whereas Case 2 corresponds to the DB-PAM-M situation.

CASE 1: Operation in PAM-M.

Step 1—First, $[a_n]$ is precoded in the transmitter according to $b_k=(a_k-b_{k-1})\bmod M$. $[b_n] \in \{0,1,\ldots,M-1\}$. Note that for PAM-2, this is equivalent to differential non-return-to-zero (differential NRZ) encoding at the transmitter end.

Step 2—At the receiver, the received signal is sampled at the optimal sampling point for PAM-M modulation, i.e., at the point corresponding to point A in FIG. 1. While FIG. 1 shows an example signal for M=4, equivalent sampling points exist for M=2, 8, etc.

Step 3—Then, classical slicing is applied to the received signal, using M-1 thresholds, thus recovering data stream $[b_n]$.

Step 4—Finally, $[a_n]$ is retrieved by applying the following formula at the decoder:

$$a_k = (b_k + b_{k-1}) \bmod M.$$

CASE 2: Operation in DB-PAM-M

Step 1—First, $[a_n]$ is precoded in the transmitter according to $b_k=(a_k-b_{k-1})\bmod M$. $[b_n] \in \{0,1,\ldots,M-1\}$. Note that this step is identical to step 1 in the PAM-M case. Thus, the transmitter behaves the same in either case.

Step 2—At the receiver, the received signal is sampled in the chromatic-dispersion-tolerant region, i.e., at a point corresponding to point B in FIG. 1. Again, while FIG. 1 illustrates the case for M=4, equivalent sampling points exist for M=2, 8, etc.

Step 3—Classical slicing is applied using 2M-2 thresholds, thus recovering data stream $[c_n]$.

Step 4—Finally, [$a_n$] is retrieved by applying the following formula at the decoder:

$$a_k = (c_k) \bmod M$$

The simplicity of the transceiver results from the similarity of the algorithms employed in Case 1 and Case 2. To start with, the transmitters are identical in both cases, since the same precoding algorithm is applied in step 1. Then, sampling at the receiver is also identical, with the only difference being the value of the sampling point parameter, as indicated in step 2. Slicing at step 3 is also very similar in both cases, but the difference in threshold count results in different sequences: [$b_n$] in Case 1, and [$c_n$] in Case 2. Nevertheless, the implementation complexity is essentially the same in both situations. Finally, the decoding formula only differs by a $a_n$ extra addition in Case 1, so they can be considered practically identical, from a complexity standpoint.

In summary, once transferred to the digital domain, both transmitter and receiver implementations are practically identical in Case 1 (e.g., PAM-4) and Case 2 (e.g., DB-PAM-4), differing only in the parameters employed for the operations in each case.

Figure 3:
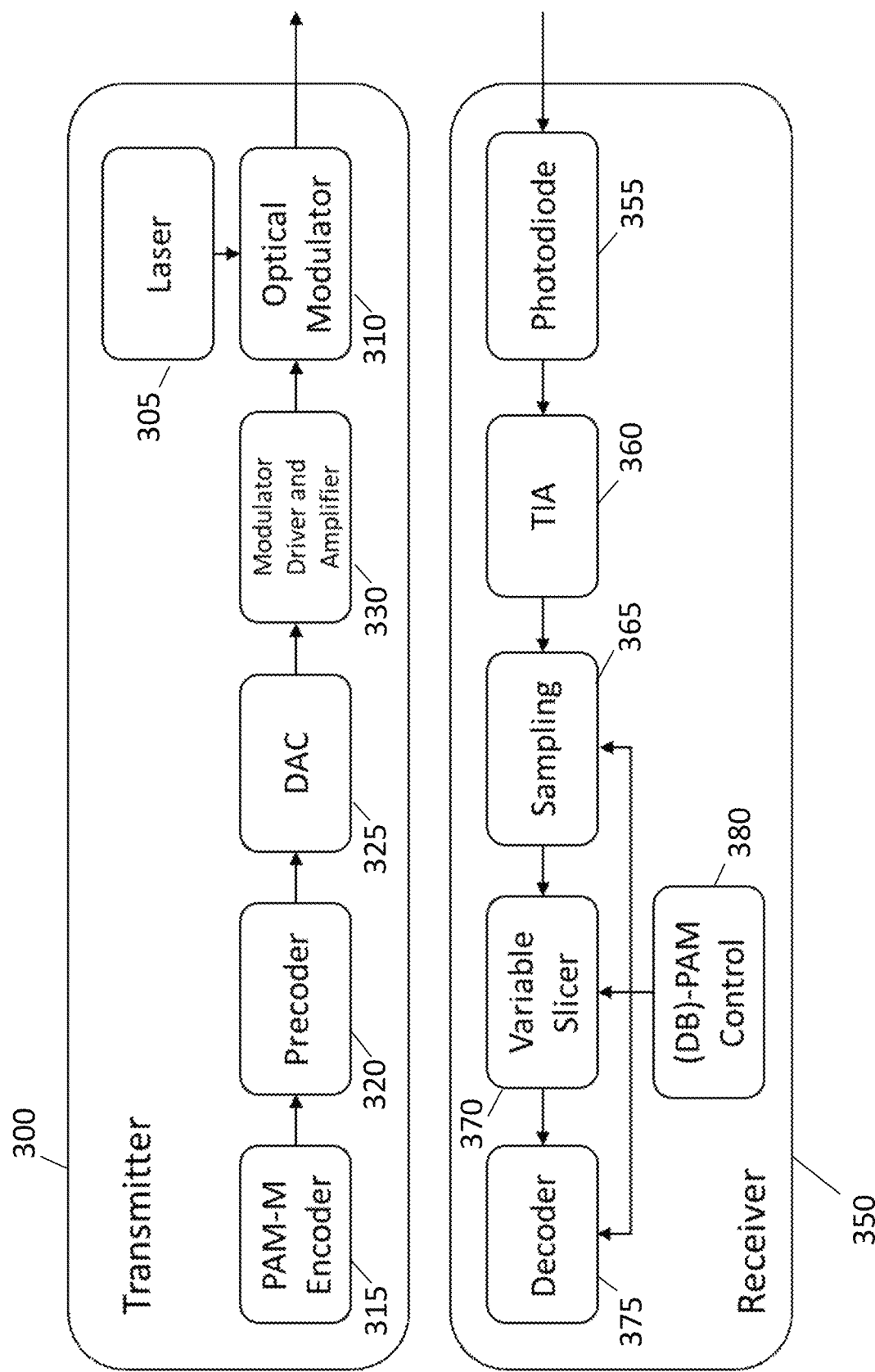
FIG. 3 is a block diagram of an example transmitter apparatus and receiver apparatus, according to some embodiments.

Similarly, the same physical components (the same physical transceiver) are employed to transmit and receive both formats. A schematic diagram of an example transmitter apparatus 300 and receiver apparatus 350 configured to operate according to the presently disclosed techniques is shown in FIG. 3. On the transmitter side, the transmitter apparatus 300 includes a laser 305 and an optical modulator 310. A PAM-M encoder 315 and precoder 320 encodes an incoming data stream as described above, for Step 1 of both Case 1 and Case 2. A digital-to-analog converter (DAC) 325 converts the precoded data into analog levels supplied to modulator driver and amplifier 330, which in turn drives the optical modulator 310. The output of the optical modulator is fed into an optical waveguide (not shown), for communication to a receiver at the opposite end of an optical link, which may comprise one or more intermediate switching points.

At the receiver 350, an optical signal is received from an optical waveguide by photodiode 355, which converts the optical signal into an electrical signal. The electrical signal is amplified by transimpedance amplifier (TIA) 360, which supplies the amplified signal to sampler 365, which is an A/D converter. The samples are converted into symbol values with variable slicer 370, and the output decoded by decoder 375, e.g., according to the techniques described above. Decoder 375, variable slicer 370, and sampler 365 are all controlled by controller 380, which, among other things, selects between a PAM-M and DB-PAM-M mode, according to any of the techniques described herein, controls the sampling times used by sampler 365, controls the variable slicer 370, e.g., to slice the sampled signal according to PAM-M or DB-PAM-M slicing, and controls the decoder 375, e.g., to reverse the precoding performed by the transmitting end, when decoding in the PAM-M mode.

It will be appreciated that controller 380 may comprise a microcontroller, microprocessor, digital logic, or some combination thereof, configured to control the components of the receiver to carry out any of the techniques described herein. The controller may include or be coupled to one or more memory devices, where the one or more memory device may store computer program code for execution by controller 380, to cause controller 380 to carry out one or more of any of the described techniques.

Figure 4:
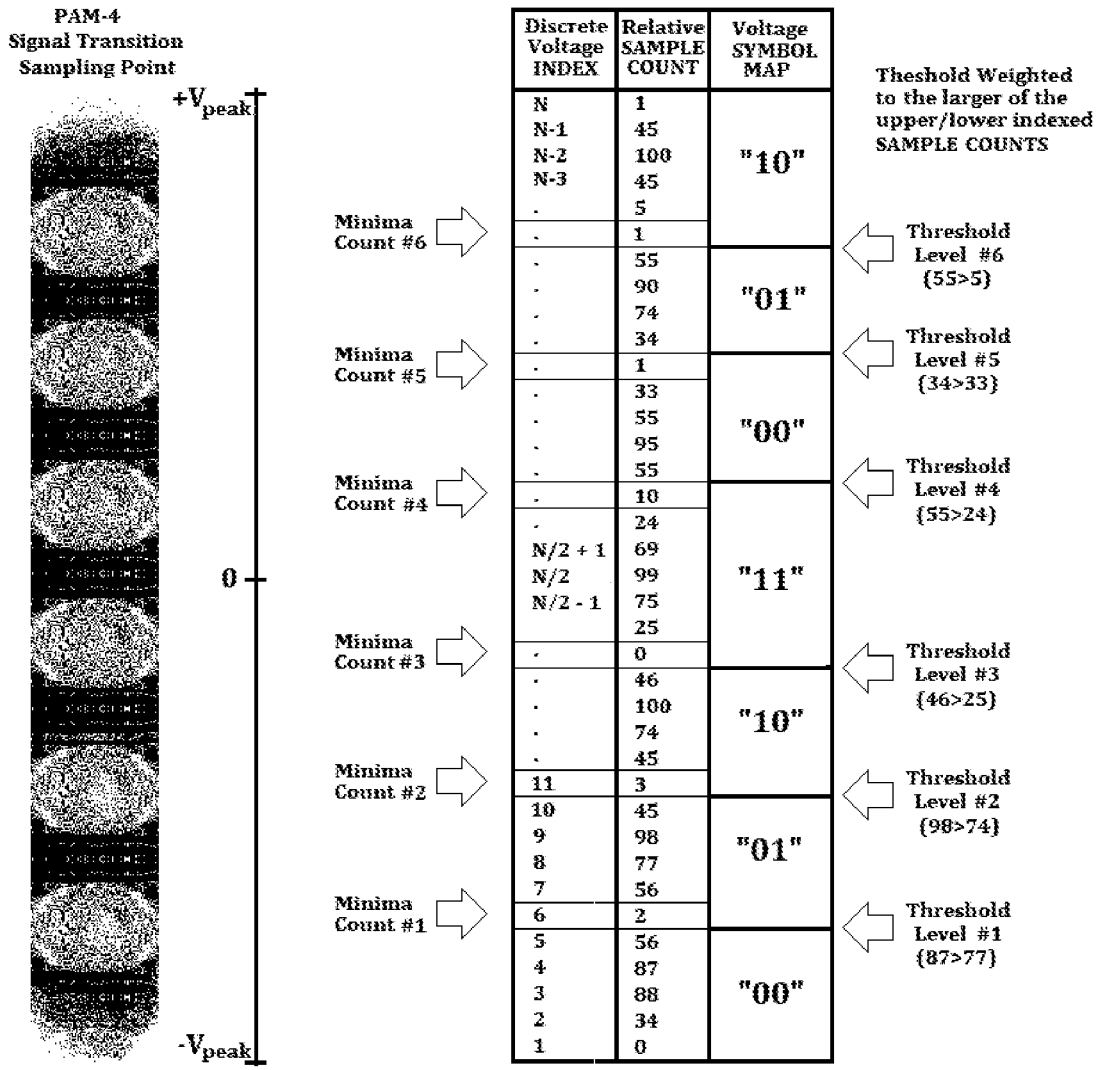
FIG. 4 illustrates dynamic establishment of threshold levels for DB-PAM-M detection, according to some embodiments.

FIG. 4 illustrates the principles of a technique for dynamically determining optimal thresholds for detecting levels when operating in DB-PAM-M mode, for the case of M=4. On the left-hand side of FIG. 4 is shown a portion of an eye pattern corresponding to the chromatic-dispersion-tolerant region of the PAM-M signal. As can be seen there, there are six relatively open "eyes." i.e., regions where the signal density is substantially lower. Optimal DB-PAM-M decoding is achieved by a "threshold level discovery" algorithm, which samples at the center of the signal transition region, at a phase of 180 degrees relative to the PAM-M sampling point. During the transmission of a training pattern, samples are rounded to N discrete amplitudes, which are counted and stored in an N-element array/histogram: "Count[Amplitude]". The M-2 threshold levels for the DB-PAM-M decode mapping procedure are the center indices of a cluster of zero/minima counts in the array "Count [Amplitude]".

FIG. 4 also illustrates the mapping of sample values, once the thresholds are determined, to symbol values. There are M-2 thresholds, which can be used to distinguish between M-1 levels. However, these are mapped to M symbol values. As can be seen in FIG. 4, for the example of M=4, this mapping corresponds to counting the levels from the bottom up, according to modM. So, in FIG. 4, the symbol values corresponding to the levels, from the bottom up, are 00, 01, 10, 11, 00, 01, and 10.

In summary, then, features of the presently disclosed techniques may include some or all of the following:

A) Transmitter-side encoding is always "standard" PAM-M, where M=2, 4, 8, etc. When M=2, differential-NRZ encoding is employed: $b_k = (a_k - b_{k-1}) \bmod M$ which is equivalent to $b_k = (a_k \text{ XOR } b_{k-1})$. More particularly, a bit stream [$a_n$] is precoded in the transmitter according to $b_k = (a_k - b_{k-1}) \bmod M$. [$b_n$] $\in \{0, 1, \ldots, M-1\}$.

B) Optical switching between a pair of optical transceivers creates a break in optical connectivity which results in a loss-of-signal (LOS) condition, which in turn triggers the start of a training pattern sequence between both ends of the communication link. This break in connectivity is thus used as an implicit signal for resetting the hand-shaking protocol between the two ends of a link.

C) Receiver-side decoding employs both the standard PAM-M and the alternate DB-PAM-M procedures, where the better performing decoding scheme based on a BER metric becomes the active decoder. This approach alleviates the need to measure link lengths between all possible resources (switch points, processors, HW-accelerators, memory, etc.) in a datacenter, but also eliminates the need for a complex decoder selection algorithm.

D) In a multi-rate variant of DB-PAM-M, an explicit message (control characters/frame) embedded in the training pattern from the medium access control (MAC) layer of the transmitter-side to the MAC layer of the receiver-side signals a "speed-up" of a network link on the condition that the BER is acceptable. The hosts at opposite ends of the link exchange an ACK if the BER is acceptable and proceed on a "speed-up" trend. If the BER rate is acceptable but the effective data rate is slower, the hosts can initiate a "speed-down" followed by reciprocal ACKs. In the event no ACK can be received due to a high BER, an implicit NACK is assumed after a timeout period of N frames, followed by the transceivers stepping down to the last working state. If all hand-shaking fails, the transceivers can simulate a "break" in the link, forcing a reset state.

E) In some embodiments, an explicit "BER feedback" and "TX-side Equalization On/Off" message could be employed to enhance link management on bi-directional links with non-symmetrical chromatic dispersion characteristics, for the purpose of configuring the forward/reverse communication paths separately (i.e., with respect to PAM-M order, equalization, etc.).

In view of the detailed examples and algorithms described above, it will be appreciated that FIG. 5 is a process flow diagram illustrating an example method, in an optical receiver, for decoding a received M-level pulse-amplitude-modulated, PAM-M, optical signal. As shown at block 510, the method comprises decoding the received PAM-M optical signal using a standard PAM-M decoder with M-1 thresholds, using first sampling times, to obtain a first set of decoded bits. As shown at block 520, the method also comprises decoding the received PAM-M optical signal using a duobinary decoder with 2M-2 thresholds, at second sampling times offset from the first sampling times, to obtain a second set of decoded bits. The decoding using PAM-M and the decoding using DB-PAM-M may be performed simultaneously or in overlapping intervals, in some embodiments, or sequentially, in others.

As shown at block 530, the method further comprises calculating first and second error metrics corresponding to the first and second sets of decoded bits, respectively. These metrics may be first and second bit-error-rates (BERs), for example. The method still further comprises selecting the standard PAM-M decoder or the duobinary decoder for subsequent decoding of the received PAM-M optical signal, based on the first and second error metrics, as shown at block 540.

In some embodiments, decoding the received PAM-M optical signal using the standard PAM-M decoder comprises recovering n decoded symbol values $[a_n^1]$ according to:

$$a_k^1 = (b_k + b_{k-1}) \bmod M, \text{ for } k=1,2,3 \ldots n,$$

where $b_k$ is the symbol detected for sample k, using the first sampling times and the M-1 thresholds, while decoding the received PAM-M optical signal using the duobinary decoder comprises recovering n decoded symbol values $[a_n^2]$ according to:

$$a_k^2 = (c_k) \bmod M, \text{ for } k=1,2,3 \ldots n,$$

where $c_k$ is the symbol detected for sample k, using the second sampling times and the 2M-2 thresholds. In these expressions:

$$[a_k^1] \in \{0,1, \ldots, M\text{-}1\},$$

$$[a_k^2] \in \{0,1, \ldots, M\text{-}1\},$$

$$[b_n] \in \{0,1, \ldots, M\text{-}1\},$$

$$[c_n] \in \{0,1, \ldots, 2M\text{-}2\}, \text{ and}$$

$$b_0 = 0.$$

In some embodiments, the selecting between the standard PAM-M decoder and the duobinary decoder is performed according to a rule that selects the duobinary decoder in the event that the second error metric indicates fewer errors than the first error metric and that otherwise selects the standard PAM-M decoder.

Figure 5:
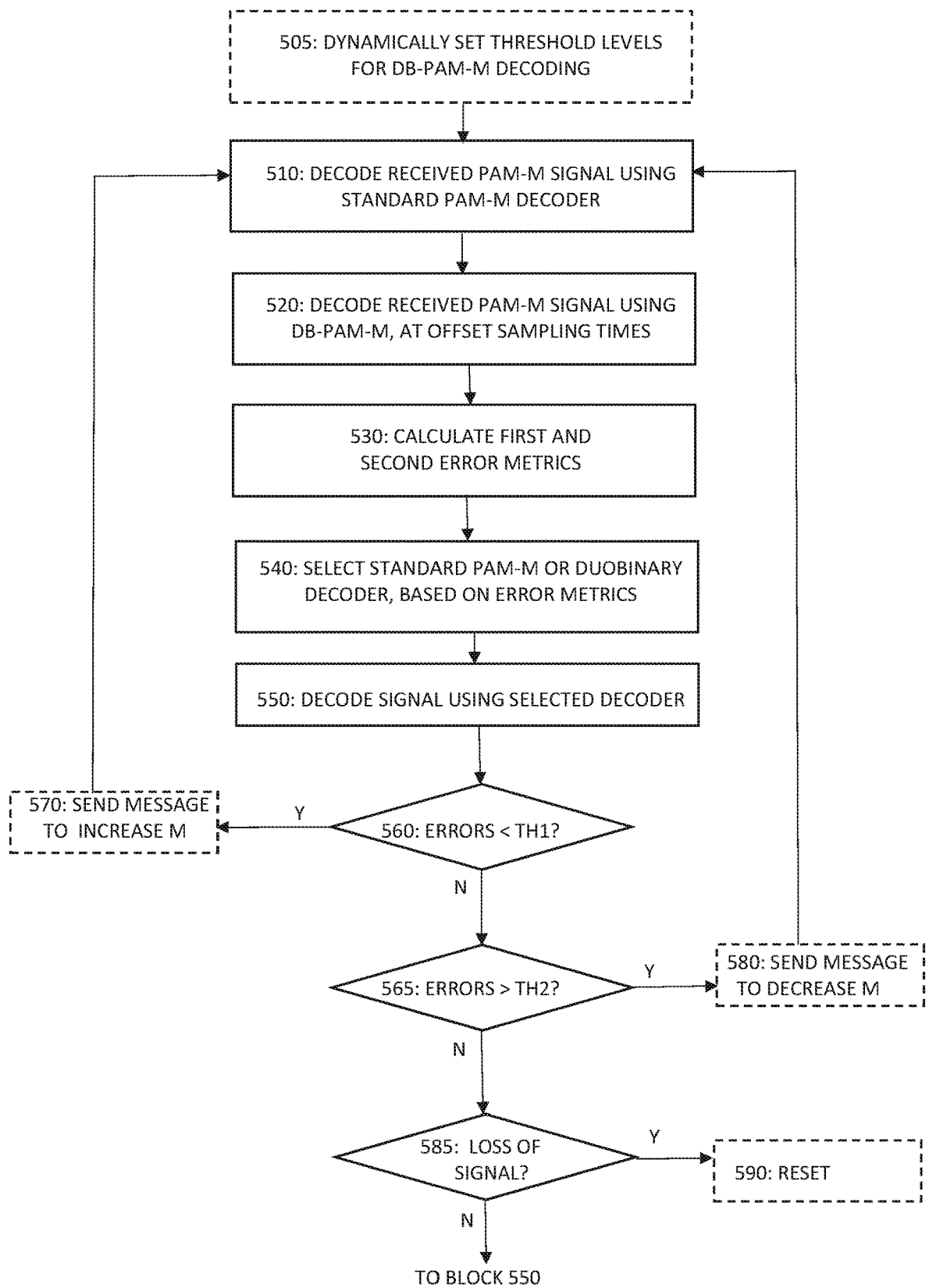
FIG. 5 is a process flow diagram illustrating an example method, according to some embodiments.

The steps shown at blocks 510-540 of FIG. 5 are performed in/for a first interval. In some embodiments, the optical transceivers involved in the communication may support changes in data rate, via changes in the modulation order. In some embodiments or instances, then, after the steps shown in block 510-540 are performed, decoding of the received signal according to the selected decoder proceeds, as shown at block 510. At some point, the receiver may determine that errors for the subsequent decoding of the received PAM-M optical signal remain below a predetermined level for a predetermined period of time, as shown at block 560. In this event, the receiver may then, in response to this determination, send a message to a node transmitting the PAM-M optical signal, the message indicating that the node transmitting the PAM-M optical signal may or should increase the value of M to a next higher order. This is shown at block 570. Then, the receiver may repeat the decoding, calculating, and selecting shown in blocks 510-540 for the increased value of M, for a second interval.

In some embodiments or instances, the receiver may instead determine that errors for decoding of the received PAM-M optical signal remain above a predetermined level for a predetermined period of time, as shown at block 565. In this event, the receiver may then, in response to this determination, send a message to the node transmitting the PAM-M optical signal, this message indicating that the node transmitting the PAM-M optical signal should or must decrease the value of M to a next lower order. This is shown at block 580. Then, the receiver may repeat the decoding, calculating, and selecting shown in blocks 510-540 for the decreased value of M, for a subsequent interval.

In still other embodiments or instances, the method may comprise determining that errors for subsequent decoding of the received PAM-M optical signal indicate a loss-of-signal condition and triggering a restart of a handshake protocol between the optical receiver and the node transmitting the PAM-M optical signal. This is shown at blocks 585 and 590.

In some embodiments, the method shown in FIG. 5 may begin with a procedure for dynamically setting threshold levels for the DB-PAM-M decoding. This is shown at block 505. This procedure may comprise, for instance, synchronizing to a received optical training pattern, to determine the first sampling times, i.e., the sampling times for PAM-M decoding, and then setting the second sampling times, for DB-PAM-M decoding, to be offset by 180 degrees from the first sampling times. This procedure may then comprise collecting a predetermined number of sample values, at the second sampling times, and calculating levels for the 2M-2 thresholds, based on the collected sample values. Calculating the levels for the 2M-2 thresholds may comprise, in some embodiments, rounding the collected sample values to N discrete levels, where N>>2M, and creating an N-element histogram by counting the sample values rounded to each of the N discrete levels, and selecting threshold levels corresponding to 2M-2 minima in the N-element histogram.

The techniques and devices described herein can be used, in various embodiments, to enable high-bandwidth communication in contexts where, for example, as described above, highly variable chromatic dispersion impairment and dynamically variable link length is expected. These techniques may also be used in reconfigurable optical networks, where, even given a constant path length, the accumulated chromatic dispersion may depend on the presence of heterogeneous devices. This is achieved in such a way that switching between formats can be achieved at practically no extra cost.

No extra elements in the transceiver are required, compared to conventional devices, thus the original footprint is maintained. Further, power consumption is kept at about the same level as the one generated by a non-switchable transceiver. The switching process can be carried out at software level, thus representing a future-proof solution that provides hardware re-utilization.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more". All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby.

What is claimed is:

1. A method, in an optical receiver, for decoding a received M-level pulse-amplitude-modulated (PAM-M) optical signal, the method comprising, for a first interval:
   decoding the received PAM-M optical signal using a standard PAM-M decoder with M-1 thresholds, at first sampling times, to obtain a first set of decoded bits;
   decoding the received PAM-M optical signal using a duobinary decoder with 2M-2 thresholds, at second sampling times offset from the first sampling times, to obtain a second set of decoded bits;
   calculating first and second error metrics corresponding to the first and second sets of decoded bits, respectively; and
   selecting the standard PAM-M decoder or the duobinary decoder for subsequent decoding of the received PAM-M optical signal, based on the first and second error metrics.

2. The method of claim 1, wherein:
   decoding the received PAM-M optical signal using the standard PAM-M decoder comprises recovering n decoded symbol values $[a_n^1]$ according to:

$a_k^1 = (b_k + b_{k-1}) \bmod M$, for $k=1,2,3 \ldots n$, where $b_k$ is the symbol detected for sample k, using the first sampling times and the M-1 thresholds;
   decoding the received PAM-M optical signal using the duobinary decoder comprises recovering n decoded symbol values $[a_n^2]$ according to:

$a_k^2 = (c_k) \bmod M$, for $k=1,2,3 \ldots n$, where $c_k$ is the symbol detected for sample k, using the second sampling times and the 2M-2 thresholds; and
   wherein:

$[a_k^1] \in \{0,1,\ldots,M\text{-}1\}$, $[a_k^2] \in \{0,1,\ldots,M\text{-}1\}$, $[b_n] \in \{0,1,\ldots,M\text{-}1\}$, $[c_n] \in \{0,1,\ldots,2M\text{-}2\}$, and $b_0 = 0$.

3. The method of claim 1, wherein said selecting is performed according to a rule that selects the duobinary decoder in the event that the second error metric indicates fewer errors than the first error metric and that otherwise selects the standard PAM-M decoder.

4. The method of claim 1, further comprising:
   determining that errors for the subsequent decoding of the received PAM-M optical signal remain below a predetermined level for a predetermined period of time;
   responsive to said determining, sending, to a node transmitting the PAM-M optical signal, a message indicating that the node transmitting the PAM-M optical signal may or should increase the value of M to a next higher order; and
   repeating said decoding, said calculating, and said selecting for the increased value of M, for a second interval.

5. The method of claim 1, further comprising:
   determining that errors for the subsequent decoding of the received PAM-M optical signal remain above a predetermined level for a predetermined period of time;
   responsive to said determining, sending, to a node transmitting the PAM-M optical signal, a message indicating that the node transmitting the PAM-M optical signal should or must decrease the value of M to a next lower order; and
   repeating said decoding, said calculating, and said selecting for the decreased value of M, for a second interval.

6. The method of claim 1, further comprising:
   responsive to determining that errors for the subsequent decoding of the received PAM-M optical signal indicate a loss-of-signal condition, triggering a restart of a handshake protocol between the optical receiver and a node transmitting the PAM-M optical signal.

7. The method of claim 1, wherein said decoding, said calculating, and said selecting for the first interval are preceded by:
   synchronizing to a received optical training pattern, to determine the first sampling times;
   setting the second sampling times to be offset by 180 degrees from the first sampling times;
   collecting a predetermined number of sample values, at the second sampling times; and
   calculating levels for the 2M-2 thresholds, based on the collected sample values.

8. The method of claim 7, wherein said calculating the levels for the 2M-2 thresholds comprises:
   rounding the collected sample values to N discrete levels, where N >> 2M, and creating an N-element histogram by counting the sample values rounded to each of the N discrete levels; and
   selecting threshold levels corresponding to 2M-2 minima in the N-element histogram.

9. An optical receiver apparatus for decoding a received M-level pulse-amplitude-modulated (PAM-M) optical signal, the optical receiver comprising a sampler, a variable slicer, a decoder, and a controller, wherein the controller is configured to:
   control the sampler, the variable slicer, and the decoder to decode the received PAM-M optical signal using a standard PAM-M decoder with M-1 thresholds, at first sampling times, to obtain a first set of decoded bits, and to decode the received PAM-M optical signal using a duobinary decoder with 2M-2 thresholds, at second sampling times offset from the first sampling times, to obtain a second set of decoded bits;
   calculate first and second error metrics corresponding to the first and second sets of decoded bits, respectively; and
   select the standard PAM-M decoder or the duobinary decoder for subsequent decoding of the received PAM-M optical signal, based on the first and second error metrics.

10. The optical receiver apparatus of claim 9, wherein:

the decoder is configured to decode the received PAM-M optical signal using the standard PAM-M decoder by recovering n decoded symbol values $[a_n^1]$ according to:

$a_k^1 = (b_k + b_{k-1}) \mod M$, for $k=1,2,3 \ldots n$, wherein $b_k$ is the symbol detected for sample k, using the first sampling times and the M-1 thresholds; and the decoder is configured to decode the received PAM-M optical signal using the duobinary decoder by recovering n decoded symbol values $[a_n^2]$ according to:

$a_k^2 = (c_k) \mod M$, for $k=1,2,3 \ldots n$, where $c_k$ is the symbol detected for sample k, using the second sampling times and the 2M-2 thresholds; and wherein:

$[a_k^1] \in \{0,1, \ldots, M\text{-}1\}$, $[a_k^2] \in \{0,1, \ldots, M\text{-}1\}$, $[b_n] \in \{0,1, \ldots, M\text{-}1\}$, $[c_n] \in \{0,1, \ldots, 2M\text{-}2\}$, and $b_0 = 0$.

11. The optical receiver apparatus of claim 9, wherein the controller is configured to select according to a rule that selects the duobinary decoder in the event that the second error metric indicates fewer errors than the first error metric and that otherwise selects the standard PAM-M decoder.

12. The optical receiver apparatus of claim 9, wherein the controller is further configured to:
   determine that errors for the subsequent decoding of the received PAM-M optical signal remain below a predetermined level for a predetermined period of time;
   responsive to said determining, send, to a node transmitting the PAM-M optical signal, a message indicating that the node transmitting the PAM-M optical signal may or should increase the value of M to a next higher order; and
   repeat the decoding, the calculating, and the selecting for the increased value of M.

13. The optical receiver apparatus of claim 9, wherein the controller is further configured to:
   determine that errors for the subsequent decoding of the received PAM-M optical signal remain above a predetermined level for a predetermined period of time;
   responsive to said determining, send, to a node transmitting the PAM-M optical signal, a message indicating that the node transmitting the PAM-M optical signal should or must decrease the value of M to a next lower order; and
   repeat the decoding, the calculating, and the selecting for the decreased value of M.

14. The optical receiver apparatus of claim 9, wherein the controller is further configured to:
   responsive to determining that errors for the subsequent decoding of the received PAM-M optical signal indicate a loss-of-signal condition, trigger a restart of a handshake protocol between the optical receiver and a node transmitting the PAM-M optical signal.

15. The optical receiver apparatus of claim 9, wherein the controller is further configured to:
   synchronize to a received optical training pattern, to determine the first sampling times;
   set the second sampling times to be offset by 180 degrees from the first sampling times;
   collect a predetermined number of sample values, at the second sampling times; and
   calculate levels for the 2M-2 thresholds, based on the collected sample values.

16. The optical receiver apparatus of claim 15, wherein the controller is configured to calculate the levels for the 2M-2 thresholds by:
   rounding the collected sample values to N discrete levels, where N $\gg$ 2M, and creating an N-element histogram by counting the sample values rounded to each of the N discrete levels; and
   selecting threshold levels corresponding to 2M-2 minima in the N-element histogram.

17. An optical transceiver apparatus comprising an optical transmitter apparatus and the optical receiver apparatus of claim 9.

* * * * *